May 20, 1969 R. J. JOHNSON 3,445,858
ADVANCE STORE ELECTRONIC LATCHING SWITCH
Filed March 10, 1965
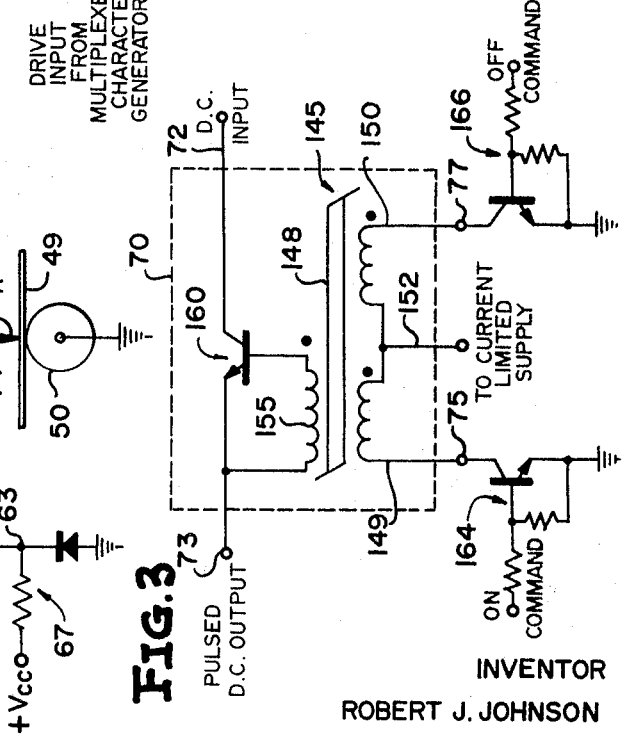
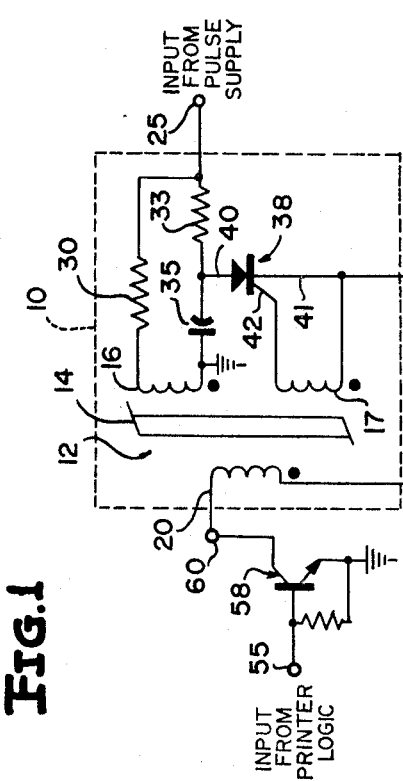
INVENTOR
ROBERT J. JOHNSON
BY *Hurvitz & Rose*
ATTORNEYS

United States Patent Office 3,445,858
Patented May 20, 1969

3,445,858
ADVANCE STORE ELECTRONIC LATCHING SWITCH
Robert J. Johnson, Fort Lauderdale, Fla., assignor to Radiation Incorporated, Melbourne, Fla., a corporation of Florida
Filed Mar. 10, 1965, Ser. No. 438,580
Int. Cl. G01d 15/06; H03k 23/24; H01g 5/01
U.S. Cl. 346—74                                                    7 Claims

ABSTRACT OF THE DISCLOSURE

A latching switch for gating pulses from a pulse source to a load in accordance with pre-programmed instructions, includes a magnetic core with substantially rectangular hysteresis loop and with three windings, and a controlled rectifier having input, output and control electrodes. The three windings of the core constitute set, reset, and output windings. An instruction to gate the next pulse applied to the input electrode of the controlled rectifier is presented in the form of a pulse applied to the set winding of the core. Pulses applied to the input electrode of the controlled rectifier are also applied to the reset winding of the core. The output or gate winding of the core is coupled across the control and output electrodes of the controlled rectifier, and the windings on the core are such that pulses applied to the set winding to change the state of the core to "set" induce a voltage in the gate winding of improper polarity to turn on the controlled rectifier, whereas a pulse applied to the reset winding after the core has been "set" produces a change of state of the core that induces a gating voltage in the gate winding to turn on the controlled rectifier. That is, once the core has been set, the next pulse applied to the reset winding, which is also supplied to the input electrode of the controlled rectifier, is effective to change the state of the core and thereby to induce a voltage in the gate winding to turn on the controlled rectifier and gate the pulse applied thereto to the output electrode.

---

The present invention relates generally to devices for gating electrical energy from a source thereof to a load circuit, and more particularly to electronic switches which may be pre-programmed to store an instruction or command that electrical energy subsequenly applied thereto is to be gated to the load circuit.

A device which is capable of being pre-programmed to transfer electrical energy from one point in an electrical circuit to another is of significant practical value in a variety of applications. In the field of electrosensitive printing, for example, data readout is provided in the form of a plurality or rows of code groups comprising bits printed by a large number of styli by the burning or decomposition of an electrosensitive sheet or recording medium. For this purpose, it is necessary to provide high speed multiplexing of voltages as high as 500 volts to the styli which in turn demand currents of the order of from 100 to 300 milliamperes to provide reliable "writing" of signals derived from character generators. In the prior art, the desired multiplexing of the high voltages has typically been accomplished by the use of relatively complex and expensive high voltage transistor circuits.

It is, accordingly, a principal object of the present invention to provide an improved switching circuit which is simple, inexpensive and reliable for high voltage switching in electrosensitive printers.

Briefly, in accordance with one aspect of the present invention there is provided a multi-terminal switching circuit, the operation of which is controlled by the application of a command signal to one of its terminals as an instruction to transfer energy from an electrical pulse applied at another of its terminals to a load circuit. Once the instruction is received, the normally open switching circuit will operate, upon application therto of the next pulse, to provide a conductive path between various points in the system for the desired energy transfer. The energy transfer occurs over a period of time determined by the width of the applied pulse. Upon termination of that pulse the switching circuit is automatically rendered incapable of responding to the application of subsequent pulses to transfer energy therefrom unless and until another command signal is received. Once having been addressed (i.e. commanded), however, the energy transfer instruction may be stored by the switch for and indefinite period until a pulse is subsequently applied to the appropriate terminal. To accomplish these objectives in a relatively simple and inexpensive switching circuit without reduction in reliability of operaton, there is provided an advance store electronic latching switch (ASEL switch) comprising a square loop saturable transformer having input, output and address windings on a magnetic core. A negative impedence element having a high impedance "off" state and a low impedance "on" state and capable of maintaing its "on" condition as long as a signal level greater than a minimum sustaining level of the device is applied thereto, is coupled to the output winding of the square loop transformer and to an input terminal of the ASEL switch. The switch is addressed by application of a command signal to the address winding of the transformer to drive the core to its set state (e.g., positive saturation). Once this condition obtains, the next pulse applied to the input terminal of the switch, to which the input winding of the transformer and the input electrode of the negative impedance element are coupled in parallel paths, will drive the core to its reset state (e.g., negative saturation), and will induce a voltage of appropriate amplitude and polarity across the output winding of the transformer to switch the negative impedance element to its low impedance "on" state. In this manner, energy is transferred from the input pulse via the negative impedance element to the load circuit. When the input pulse terminates, the current through the negative impedance element drops below the minimum sustaining level and the switch is cut off. Subsequent pulses applied to the switch will be blocked thereby since they tend only to drive the core to its reset state, a condition in which the core presently exists unless a further command signal has been applied to the address winding of the transformer.

It is, therefore a further object of the present invention to provide a switch capable of being pre-programmed for actuation on command.

In accordance with a further feature of the present invention there is provided an interrupter switch employing some of the features of the previously described latching switch to convert a high voltage D.C. input to a pulsed D.C. output. A saturable transformer having a magnetic core with rectangular hysteresis loop and three windings thereon, substantially as describer above, is employed as the control mechanism of the switch. In this case two of the windings are employed as input windings to which appropriate signals are coupled for driving the core into its set and reset state respectively, while the third winding is connected to a switching transistor coupled between input and output terminals of the interruptor switch. Successive low level signals applied to the respective input windings of the transformer are effective to alternately drive the core into its set and reset states to produce a forward bias on the transistor via the third winding during the period between the two states of magnetic saturation. This produces the desired interruption of the high voltage d.c. input to provide a pulsed output from the switch. The width of the output pulses is thus controlled by the length of time required by the core to switch from one state to the other, a selectable parameter.

The above briefly described embodiments of switching circuits in accordance with the present invention are advantageously employed in an electro-sensitive printer circuit for multiplexing high voltage pulses required for burning or decomposing the recording medium and for driving the styli in response to signals received from an appropriate character generator.

It is therefore a still further object of the present invention to provide improved stylus driving switches for electrosensitive printers.

It is to be emphasized, with respect to the above brief description and the ensuing detailed description of specific embodiments, that although switches in accordance with the present invention are described primarily from the standpoint of their use in electrosensitive printers, such switches may be employed with equal facility and performance in a host of other applications. Those skilled in the art will readily appreciate, following a consideration of this specification, that the ASEL switch may be advantageously employed, for example, as: the core driver for a magnetic memory plane; a logic element comprising differentiator, flip-flop and AND gate, which, when an input pulse is applied simultaneously to differentiator and AND gate subsequent to the flip-flop being set, functions to reset the flip-flop and "and" the signal obtained therefrom with the input pulse to gate the latter to an output circuit; a switch for high level digital to analog conversion with built-in memory; or a high speed detector for automatic cutoff of power supplies in the event of system failure.

The above and still further objects, features and attendant advantages of the present invention will become apparent from a consideration of the following detailed description of certain illustrative embodiments thereof, especially when taken in conjunction with the accompanying drawings in which:

FIGURE 1 is a schematic diagram of an advance store latching switch in accordance with the present invention;

FIGURE 2 is a block diagram of an electrosensitive printer system employing keying and stylus driving switches of the type shown in FIGURE 1; and FIGURE 3 is a schematic diagram of a high voltage D.C. interrupter switch in accordance with the present invention.

Referring now to the drawings, FIGURE 1 illustrates a preferred form of advance store electronic latching (ASEL) switch. The switch structure comprises, in this embodiment, the circuitry enclosed by the dotted lines designated by reference numeral 10. Transformer 12 comprises a magnetic core 14 having a substantially rectangular hysteresis loop, which, as is well known in the art, is characterized by low coercive force and high remanence. Core 14 is illustrated in a conventional manner as an idealized rectangular hysteresis loop. This type of core is commonly comprised of materials such as oriented silicon steel, iron-nickel alloy, or certain ferrites, and is typically fabricated in the shape of a ring.

In the exemplary embodiment of FIGURE 1, transformer 12 includes an input or reset winding 16, an output or gate winding 17, and an address or set winding 20. Conventional dot symbols are employed to illustrate the mutual inductive coupling relationships existing between several windings of the transformer.

One end of input winding 16 is connected to the switch input terminal 25 via resistor 30, the other end of the input winding being grounded. Input terminal 25 is also connected to one electrode of a three-terminal negative impedance device 38 via a resistor 33. In FIGURE 1, device 38 is depicted as a silicon controlled rectifier (SCR), but subject to certain limitations which will hereinafter be discussed, any negative impedance element may be employed in its stead, with appropriate modification of the circuit connections. As is well known, a silicon controlled rectifier is characterized by a high impedance "off" state and a low impedance "on" state. Once having been triggered or fired to its conductive condition, the SCR will remain in that condition so long as the level of current passing there through is equal to or greater than the minimum sustaining current for the device.

Input terminal 25 is connected through resistor 33 to the anode 40 of SCR 38 and is further coupled to a point of reference potential (for example, ground) via a coupling capacitor 35. The output or gate winding of transformer 12 is coupled across the control electrode 42 and the cathode 41 of SCR 38. Cathode 41 is also connected to an output terminal 44 of latching switch 10. The address winding 20 of transformer 12 is connected at one end to a terminal 60 and at the other end to a terminal 63.

When employed as a stylus driver for an electrosensitive printer, switch 10 is connected to external circuitry in the manner illustrated in FIGURE 1. Output terminal 44 is connected to a stylus 47 of the printer. It will be understood, of course, that stylus 47 is merely one of a plurality of styli disposed adjacent an electrosensitive sheet or recording medium 49 which is moved relative to a grounded platen 50. Currents for burning away a data record in the form of bit coded groups, are derived from high level pulses applied to input terminal 25 and transferred, in a manner to be described, to the stylus via SCR 38.

A switch 58 is connected to terminal 60 of switch 10, and a current limited voltage supply 67 is connected to terminal 63. Switch 58 may, for example, comprise a normally non-conductive transistor with associated biasing components. Upon application of logic level signals from the character generators to the base of the transistor of switch 58 via terminal 55, it is driven to a conductive state and thus provides a conductive path for current through winding 20 from voltage supply 67.

In the operation of the circuit of FIGURE 1, assume that magnetic core 14 in initially in its reset condition (e.g. negative saturation). A logic level input at terminal 55 biases switch 58 to conduction so that current is transferred from supply 67 through address winding 20 of transformer 12 to ground. This results in core 14 being set, that is, core 14 is driven to a state of positive flux saturation. In addition, a voltage is induced in output winding 17, but of improper polarity to switch normally non-conductive SCR 38 to its low impedance "on" state. This sequence of events constitutes an instruction to switch 10 that stylus 47 is to be energized by the next succeeding pulse applied to terminal 25, such that a bit will be printed on electrosensitive sheet 49.

Energization of the stylus is accomplished in the following manner. When the core has been set, an input pulse applied to terminal 25 will produce a flow of current through input winding 16 to reset the core. The level of current flow through winding 16 is determined by appropriate selection of resistor 30. Simultaneously with its application to input winding 16, the pulse is applied to the parallel path containing resistor 33. Capacitor 35 has a value selected to shunt high frequency components of the input pulses to ground, but does not otherwise affect circuit operation. Hence, except for any high frequency components present in the input pulse no current flows through resistor 33 because of blockage by SCR 38. As the core 14 is reset, however, a voltage is induced across output winding 17 of transformer 12 of proper polarity and amplitude to switch SCR 38 to its low impedance state, whereupon current flows through the path including resistor 33, SCR 38, stylus 47, electrosensitive sheet 49 and plate 50 to ground. The switching of SCR 38 will, of course, occur substantially simultaneously with the application of core driving current to input winding 16. Current will continue to flow through SCR 38 as long as its level is greater than the minimum sustaining level of the SCR. Hence, current of sufficient level will be transferred to maintain the SCR "on" over the entire duration of the pulse, provided the current conduction of the electrosensitive sheet is greater than the holding (i.e. minimum sustaining) current of the SCR.

Upon termination of the input pulse at terminal 25, core 14, having been driven to reset, is again ready to be addressed. Unless a further instruction signal is received at terminal 55, any subsequent input pulses applied to terminal 25 will be blocked by SCR 38 since such pulses tend only to drive core 14 to reset, which is the then-existing condition of the core. If no signals are to be recorded on sheet 49, no instruction signals are applied to terminal 55.

In this mode of operation of switch 10, the width of the D.C. pulse applied to input terminal 25 substantially determines the writing time of the stylus. When the pulse terminates, core 14 is left in its reset condition of negative flux saturation and may subsequently be set or not depending respectively on whether or not a bit is to be recorded by the stylus. If no instruction to that effect is received from the printer logic via terminal 55, there will be no change in the condition of flux saturation of the core as subsequent D.C. pulses are applied to terminal 55. Hence, SCR 38 will not receive a firing signal at its control electrode and will, therefore, remain in its high impedance state.

Any of the presently available low current high speed silicon controlled rectifiers are suitable for use in switch 10. When switch 10 is employed as a stylus driver in an electrosensitive printer, as has been described, high leakage current can be tolerated, permitting relatively inexpensive SCR's to be employed without loss of reliability. In this respect, it will be appreciated that high leakage currents are not considered undesirable for electrosensitive printer use because even maximum values thereof are considerably lower than the current levels required to burn the electrosensitive paper or to sustain the SCR in its low impedance state. It is again to be emphasized that although a silicon controlled rectifier has been illustrated and described as the active element in the advance store electronic latching switch, other negative impedance elements are capable of substitution therefor, provided only that the signal applied by the output winding is sufficient to render the device conductive and that sufficient isolation is maintained between the output winding and the applied D.C. input pulse.

Referring now to FIGURE 2, there is illustrated a portion of an electrosensitive printer system employing advance store latching switches of the type which have been described in connection with FIGURE 1. Assuming, for purposes of illustration, an electrosensitive printer having 100 styli, the latter may be divided into ten groups of ten latching switches. In FIGURE 2, three groups of ten switches each are generally designated by respective reference numerals 100, 110 and 120. Only three switches are shown in each of these groups but it will be understood that the dashed lines between the second and last switches of each group indicate the presence of the additional switches. Of course, any number of groups and of switches within a group may exist depending on the particular electrosensitive printer arrangement and number of styli therein. Each of the switches 80 in the groups 100, 110 and 120 correspond in structure and operation to switch 10 of FIGURE 1. Thus, leads 82, 83 and 85 correspond to the leads connected to terminals 25, 44 and 60 of switch 10. The connecting leads to current limited voltage supplies are not shown in FIGURE 2 for purposes of simplicity and clarity. Logic level signals provide the desired command or instruction signals to the switches 80 from multiplexed character generators of the printer via the respective leads 85. Connections to the various styli are provided through leads 83.

Multiplex switches 90 similarly correspond in structure and operation to that of switch 10 of FIGURE 1. Each of switches 90 provides successive D.C. input pulses to each of the several switches 80, in the respective group associated therewith, via leads 95 and 82, in response to multiplex control signals received at leads 93. Leads 92, 93 and 95 of switches 90 thus correspond to the circuit connections to terminals 25, 60 and 44, respectively of switch 10 in FIGURE 1. The input pulses applied to switches 90 via leads 92 are derived from an interrupter switch 70 to which a D.C. or rectified A.C. level is applied at lead 72.

Instruction or command signals are multiplexed to switches 90 via leads 93 during the "off" time of the pulsed D.C. signal at the respective leads 92. Those of switches 90 which have received an instruction signal will transfer the next succeeding pulse at the respective leads 92 to the input leads 82 of switches 80. Passage of these pulses to the various styli through one or more switches 80 will depend on whether or not each has been instructed to do so by a logic level signal from the multiplexed character generators.

Interrupter switch 70 of FIGURE 2 is illustrated in detail in FIGURE 3. The switch comprises a saturable transformer 145 including a magnetic core 148 having a substantially rectangular hysteresis loop on which are wound three coils 149, 150 and 155. Again the inductive coupling relationships existing between the various windings are illustrated by conventional dot symbols. Windings 149 and 150 are input windings having a common junction to which is connected a current limited voltage supply (not shown) via lead 152. The other end of each of the windings 149 and 150 is connected respectively to a terminal 75 or 77 of switch 70. Normally non-conductive transistor switches 164 and 166 are connected to respective terminals 75 and 77 for selective actuation to provide conductive paths for current from the current limited voltage supply. One end of output winding 155 is connected to the base electrode of high voltage switching transistor 160, and the other end of winding 155 is connected to the emitter electrode of transistor 160 and to terminal 73. The collector electrode is coupled to D.C. input terminal 72.

In the operation of switch 70, assume that magnetic core 148 of transformer 145 is initially in the reset condition, for example negative saturation. A low level command pulse applied to the base electrode of switching transistor 164 renders that transistor conductive to provide a path for current from the current limited voltage supply through input winding 149. During this time switching transistor 166 is cut off and thus no current flows through input winding 150. The application of current to winding 149 will drive core 148 to its set condition (e.g., positive saturation). Constant base drive for transistor 160 is thus provided via control winding 155 during the time required for core 148 to be driven from its reset to its set conditions, i.e. the time required to completely switch the magnetic saturation states of the core. While this constant base drive is present transistor 160 is rendered conductive and D.C. current flows from input terminal 72 to output terminal 73. It is necessary that transistor 160 remain conductive for a period of time longer than the longest time required for a bit to be printed on the electrisensitive recording sheet. That is, each pulse provided at the output of switch 70 should be as wide as is necessary to provide the maximum required length of time for burning the bit into the electrosensitive sheet. If core 148 of transformer 145 switches from reset to set states in a period less than the longest time required for energization of printer styli, transistor 160 will lose its base drive and hence be driven into cut off. Of course, for a particular application the print rate and print time for the styli are known and the switching rate for the magnetic core can be selected in accordance therewith. Magnetic cores of the type which have been described for use in this invention are typically provided with such published data.

When the required pulse lengths have been determined, the trigger circuit (not shown) for transistors 164 and 166 is arranged to saturate transistor 166 during the "off" time of the styli and to saturate transistor 164 during the "on" time of the styli to produce the desired switching of transistor 160.

It will be apparent to those skilled in the art that it is extremely desirable to reduce the number of high voltage high current transistor switches required in an electrosensitive printer system, since such switches are relatively expensive and complex. This is accomplished in the system of FIGURE 2, since only one high voltage transistor switch (70) is required and that switch is a distinct improvement over the prior art switches of the high voltage high current type. Moreover, the use of advance store electronic latching switches in accordance with the present invention as a replacement for high voltage transistor circuits, which would otherwise be required, in the system of FIGURE 2 represents a decided improvement over previous electrosensitive printing control systems.

While I have illustrated and described certain specific embodiments of my invention, it will be understood that various changes and modifications in the specific details of construction and operation may be resorted to without departing from the true spirit and scope of the invention. For example, while it has been specified that a D.C. input interrupted to provide the required pulses to the various switches and subsequently to the styli of the printer system, the necessary pulses could also be derived from an unfiltered rectified A.C. voltage provided that the print cycle is made synchronous with the A.C. frequency of the source. As another example of a modification which is within the scope of the present invention, the core switching voltage is specified to have been derived from a current limited voltage source simply because the magnetic core behaves more reliably when driven by a voltage source. It will, however, be understood that current drive may alternatively be employed, if desired. These and other possible modifications will immediately be perceived by those skilled in the art from a consideration of the foregoing description.

I claim:

1. A latching switch for gating pulses from a pulse source to a load in accordance with pre-programmed instructions, comprising a bistable multivibrator including set input terminal, reset input terminal, and gate output terminal; a negative impedance device having input, output and control electrodes and actuable from a normal high impedance mode of operation to a low impedance mode of operation in response to application of a gating signal to the control electrode thereof; said device being effective, when actuated to said low impedance mode, to remain therein during the period that the level of current conducted therethrough is equal to or greater than a predetermined minimum sustaining current level of said device; means for applying set signals to said set input terminal; means for simultaneously applying the same pulses of predetermined polarity from said pulse source to both the input electrode of said device and to the reset input terminal of said multivibrator; said multivibrator being responsive only to the reset signal next in immediacy to the application of a set signal thereto to produce a gating signal at said gate output terminal; means coupling the gate output terminal of said multivibrator to the control electrode of said device; and means for coupling said output electrode of said device to said load.

2. The combination according to claim 1 wherein said bistable multivibrator is a transformer having a magnetic core with a pair of opposite polarity states of magnetic saturation, said core having set, reset and gate windings thereon to which said set, reset, and gate terminals are respectively connected, said set signals being effective to drive said core into one of said states of magnetic saturation and said reset signals being effective to drive said core into the other of said states of magnetic saturation.

3. The combination according to claim 2 wherein said negative impedance device is a silicon controlled rectifier, said input and output electrodes being respectively the anode and cathode thereof, said anode being coupled to said reset winding of said transformer, said control electrode and cathode being coupled across said gate winding of said transformer.

4. A switching circuit for providing current pulses to a stylus of an electrosensitive printer in accordance with pre-programmed instructions for the recording of signal information on an electrosensitive sheet of said printer, comprising a transformer having a magnetic core with a substantially rectangular hysteresis loop; first, second and third windings on said core; means for applying instruction signals to said first winding to drive said core to one of two opposite polarity states of magnetic saturation; a controlled rectifier having a cathode, an anode, and a control electrode; means for simultaneously applying the same high voltage pulses to said second winding and to the anode of said rectifier; means coupling the control electrode and the cathode of said rectifier across said third winding, means connecting the cathode of said rectifier to said stylus; said core being drivable into the other of said opposite polarity states of magnetic saturation only by the high voltage pulse applied to said second winding next in immediacy to the application of an instruction signal to said first winding, whereby a voltage is induced on said third winding to switch said rectifier from its normal high impedance mode of operation to its low impedance mode of operation to transfer current from said pulse next in immediacy, to said stylus.

5. In a printer system for recording signals on an electrosensitive medium in response to programmed instructions from a plurality of multiplexed character generators, said signals being recorded by a plurality of styli energized in accordance with said programmed instructions, switching means for transferring high level recording currents to said styli from a train of pulses applied to said switching means in accordance with said pre-programmed instructions, and pulse source means for providing pulses to said switching means, each of said switching means comprising a bistable multivibrator having set input terminals, reset input terminal and gate output terminal; a negative impedance element having input, output, and control electrodes and actuable from a normal high impedance mode of operation to a low impedance mode of operation in response to the application of a gating signal to the control electrode thereof; said device being effective, when actuated to said low impedance mode to remain therein during the time interval over which the current conducted therethrough is greater than the minimum sustaining current of said device; means for applying set signals to said set input terminal; means for simultaneously applying the same pulses from said source means to both the input electrode of said device and to the reset input terminal of said multivibrator, said multivibrator being responsive only to the reset signal next in immediacy to the application of a set signal thereto to provide a gating signal at said gate output terminal; means coupling the gate output terminal of said multivibrator to the control electrode of said device; and means coupling the output electrode of said device to one of said styli of said printer.

6. The combination according to claim 5 wherein said pulse source means includes a transformer having a magnetic core and first, second and third windings on said core; said core having a substantially rectangular hysteresis loop; a high voltage switching transistor having input, output and control electrodes; means coupling said control and output electrodes across said third winding; said transistor being normally non-conductive and effective, when a bias voltage of predetermined polarity is applied across said control and output electrodes thereof, to provide a conductive path between said input and output electrodes; means for applying a low level set signal to said first winding said core to one of two opposite polarity states of magnetic saturation; means for applying a low level reset signal to said second winding to drive said core to the other of said states of magnetic saturation; said bias voltage of predetermined polarity being induced across said third winding during the interval of time required by said core to switch from said other state to said one state; and means for applying a continuous high voltage waveform to said input electrode, so that high voltage pulses are produced at said output electrode at a repetition frequency determined by the alternate application of said low level set and reset signals to said first and second windings respectively.

7. An advance store electronic latching switch comprising storage means having a pair of stable states and energizable to either one of said states when presently in the other of said states, said storage means having
two input circuits for respective energization to one and to the other of said states, and
an output circuit;
gating means having an input electrode, an output electrode, and a control electrode, and responsive to application of a trigger voltage to said control electrode to conduct signal applied to said input electrode to said output electrode, said control electrode connected to said output circuit of said storage means; and
means for simultaneously applying the same pulse signal to said other state-energizing input circuit and to said input electrode of said gating means for possible gating to said output electrode;
said output circuit responsive only to a change in state of said storage means from said one state to said other state to supply a trigger voltage to said control electrode, whereby energization of said storage means to said one state is effective as a programmed instruction to pass the next pulse signal applied simultaneously to said other state-energizing input circuit and to said input electrode.

References Cited
UNITED STATES PATENTS

| | | | |
|---|---|---|---|
| 3,074,066 | 1/1963 | Conerly | 346—74 |
| 3,207,919 | 9/1965 | Conklin et al. | 340—174 X |
| 3,233,113 | 2/1966 | Apple et al. | 307—88 |
| 3,283,312 | 11/1966 | Marcus et al. | 307—88 X |
| 3,324,312 | 6/1967 | Perry et al. | 307—314 |

BERNARD KONICK, *Primary Examiner.*

J. F. BREIMAYER, *Assistant Examiner.*

U.S. Cl. X.R.

307—88, 282, 314; 317—252